Nov. 8, 1938.                J. MIHALYI                 2,135,984
                      MOTOR DRIVE UNIT FOR CAMERAS
                      Filed July 13, 1937           2 Sheets-Sheet 1
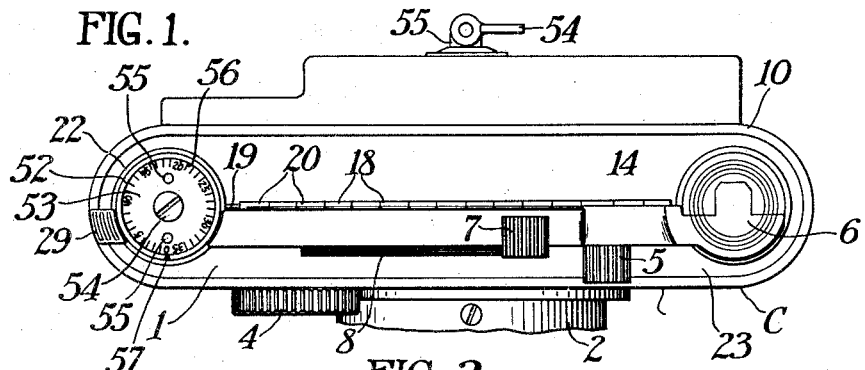
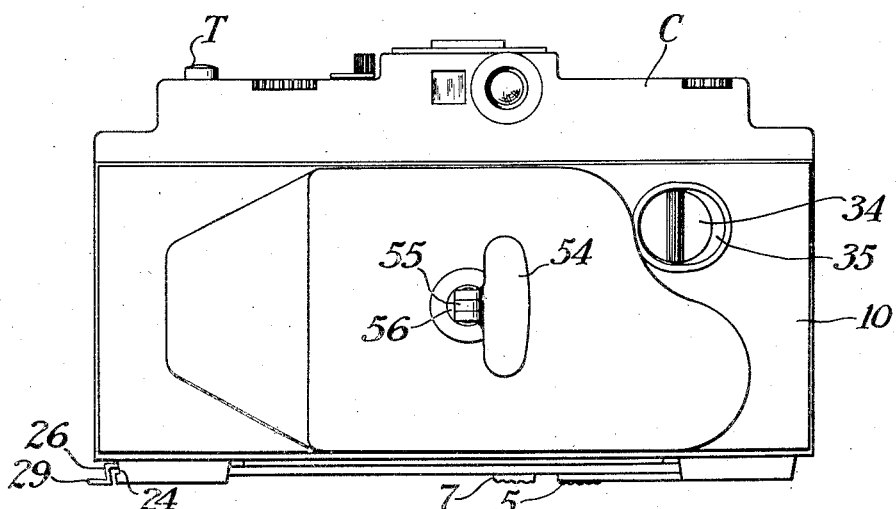
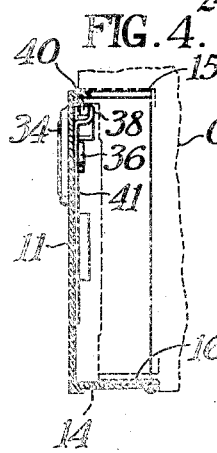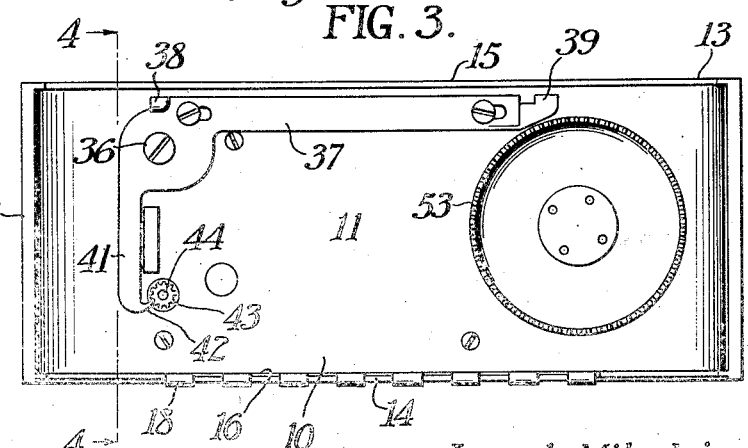
Joseph Mihalyi
INVENTOR
BY
ATTORNEYS Nov. 8, 1938.     J. MIHALYI     2,135,984
MOTOR DRIVE UNIT FOR CAMERAS
Filed July 13, 1937     2 Sheets-Sheet 2

Joseph Mihalyi
INVENTOR
BY
ATTORNEYS

Patented Nov. 8, 1938

2,135,984

UNITED STATES PATENT OFFICE 2,135,984

MOTOR DRIVE UNIT FOR CAMERAS

Joseph Mihalyi, Rochester, N. Y., assignor to Eastman Kodak Company, Rochester, N. Y., a corporation of New Jersey Application July 13, 1937, Serial No. 153,351

5 Claims. (Cl. 95—31)

This invention relates to photography and more particularly to photographic cameras.

One object of my invention is to provide a motor drive unit for cameras which can be readily attached and detached. Another object of my invention is to provide a motor drive unit which may be removably attached to a camera with a safety latching mechanism so arranged that when the back is detached from a camera, the motor is locked against operation, and when the motor is attached to a camera, the motor is automatically released for operation. Another object of my invention is to provide a camera in which the motor carying back is normally hingedly attached to the camera and in which at least one of the locking elements forms a part of the hinge connection between the camera back and camera. Still another object of my invention is to provide a combined hinge and latching mechanism which can be used to safely connect the camera back to the camera and which at the same time forms a latching device which can be quickly and easily released, and other objects will appear from the following specification, the novel features being particularly pointed out in the claims at the end thereof.

In certain cameras, such as cameras taking a large number of relatively small pictures on roll film, it is frequently desirable to take a series of pictures rapidly. One of the objects of my invention is to provide a power-driven back which is suitable for certain types of cameras and which may be readily attached for use by the user so that by having a normal camera back and a motor drive unit camera back, these can be interchanged at will.

In the drawings, in which a typical and preferred embodiment of my invention is shown, and in which like reference characters denote like parts throughout:

Fig. 1 is a bottom plan view of a typical camera equipped with a motor drive unit camera back, constructed in accordance with and embodying a preferred form of my invention.

Fig. 2 is a rear elevation of the camera shown in Fig. 1 showing the motor drive unit attached to the camera in position for use.

Fig. 3 is an inside plan of the camera back removed from the camera, certain parts of the back being removed to show the latching mechanism and the dished gear which drives the film winding mechanism.

Fig. 4 is a fragmentary detail section on line 4—4 of Fig. 3, parts being removed to show the interengaging camera back and body construction.

Figure 5:
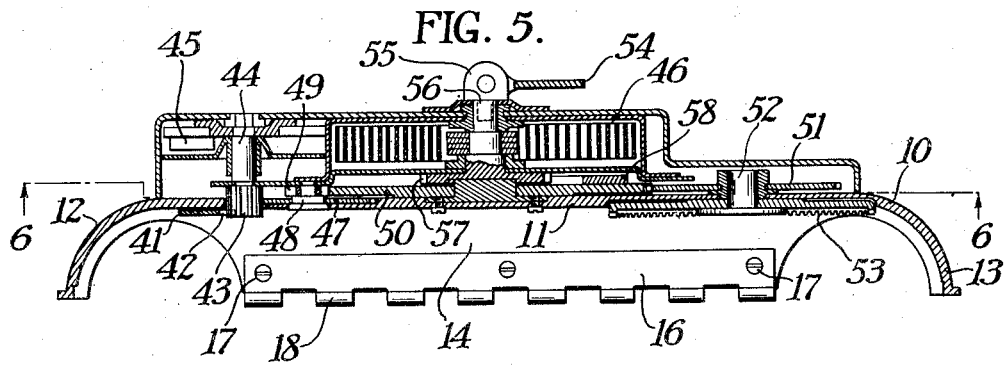
Fig. 5 is a longitudinal section through the motor drive unit camera back removed from a camera.

As a typical and preferred embodiment of my invention I have shown a motor drive unit as being attached to a small-size camera adapted to take a large number of exposures on motion picture film. In the bottom plan view of this camera shown in Fig. 1, I have shown portions of a camera body 1 having an objective mounted in the sleeve 2 which is attached to the front 3 of the camera so that it may be focused by turning the knurled ring 4. This camera is provided with a handle 5 adapted to turn the crank 6 to rewind film on the supply spool, as fully explained in my copending application Serial No. 145,497, filed May 29, 1937, for "Film winding mechanism". The bottom of the camera is also provided with a handle 7 which may slide in a slot 8 for removably attaching a removable roll holder as is fully explained in my copending application Serial No. 153,352, filed July 13, 1937, for "Two-part roll holding camera."

It is to be understood that the present motor drive unit, which consists of a motor and camera back, is so constructed that it may be either attached directly to a roll holding camera, as shown in my copending application for "Camera winding device," Serial No. 137,483, filed April 17, 1937, or it may be attached directly to a roll film holder which may be removably mounted on a camera, as disclosed in my copending application Serial No. 153,352, above referred to.

The present invention is chiefly concerned with the motor drive unit, the camera latch for removably holding this unit on the camera and the means for preventing the motor unit from being damaged or unwound when the motor unit is removed from the camera.

In accordance with the present embodiment of my invention, the camera back 10, as shown in Figs. 3 and 5, consists of a flat plate 11 curved at its ends 12 and 13 to form walls of a spool chamber and having downwardly extending flanges 14 and 15 between the end walls 12 and 13. Flange 14 is adapted to carry a hinge element 16 which may be attached to it in any suitable manner, as by screws 17. This hinge element carries a series of cylindrical-shaped bearings 18 adapted to receive a hinge pintle 19, as shown in Figs. 7 and 8.

The camera likewise has a series of bearing members 20 adapted to receive the hinge pintle 19, so that by aligning the bearings 18 and 20, the hinge pintle may be passed through the various openings to hold the back in hinged relation with the camera body.

The hinge pintle is used as one of the latch members for holding the motor drive unit back or the normal camera back on the camera. This latch is operated in a manner best shown in Figs. 7 and 8. The hinge pintle 19 slides through an annular member 22 carried by the camera back bottom wall 23, this forming a slideway through which the pintle may partially pass. The forming has openings 24 and 25 for the entrance and exit of a portion of the hinge pintle 19, and the pintle is definitely held against an axial sliding movement by means of a latch which is formed by the metal flange 26 which carries a downwardly extending lug 27 adapted to engage an aperture 28 in the camera back. Thus as long as the latch elements 27 and 28 are in engagement, the pintle is definitely fixed in an operative position in which it extends through the bearing members 18 and 20. In this position the back may be opened and closed by being swung upon the hinge to load and unload film in the usual manner.

Figure 7:
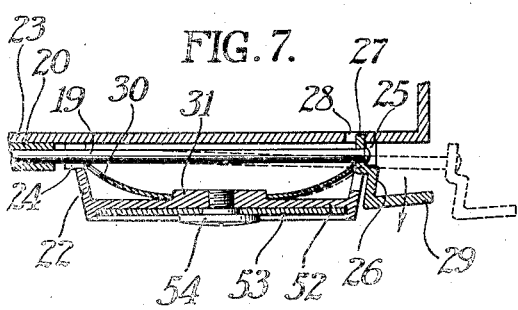
Fig. 7 is an enlarged fragmentary sectional view showing the hinge pintle latch in a latched position to hold the camera back on the camera.
Figure 8:
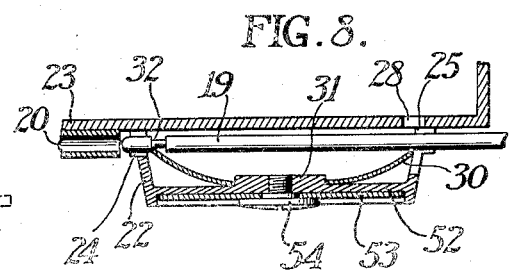
Fig. 8 is a similar view but with the hinge pintle withdrawn to its unlatched position.

When it is desired to remove the motor drive unit, the handle 29 may be used to unlatch the cooperating elements 27 and 28 by moving the handle in the direction shown by the arrow in Fig. 7 and at the same time sliding the hinge pintle axially. Since the hinge pintle itself is springy, and since the openings 24 and 25 are of somewhat larger diameter than the diameter of the pintle, this unlatching movement can be readily accomplished.

It might also be noted that the spring washer 30 which surrounds a central annular forming 31 also serves to press the hinge pintle toward the camera back and thus to hold the latch elements 27 and 28 in operative latching relationship.

When the handle 29 is released, as by moving it to the broken line position of Fig. 7, the hinge pintle may be drawn axially through the slideway until it definitely comes to a stop. This stopping movement is caused by a reduced area 32 which is in the form of an annular groove in the end of the hinge pintle 19, being engaged by an arm of the spring washer 30. Thus, this washer serves, not only to hold the latch elements 27 and 29 in latching engagement, but it prevents the operator from totally withdrawing the hinge pintle 19 from the slideway in the camera body. As will be seen from Fig. 8, when the spring washer 30 engages the notch 32, the end of the pintle has been withdrawn from the last bearing member 30, so that the hinge elements are no longer held together. The back can therefore be removed if the latch on the opposite edge of the back has been first released.

This latch consists of a slidable handle 34, movable in a recess 35 in the back 10. As shown in Figs. 2 and 3, the handle 34, by means of a stud 36 extending through a slot in the camera back, moves an L-shaped latching bar 37, this latching bar having hook elements 38 and 39 adapted to engage complementary latch elements in the form of pins, one of which, 40, is shown in Fig. 4, this element forming a part of the camera designated broadly as C.

In Fig. 3 the camera back latch is shown as being in its unlatched position, in which position an arm 41 of the L-shaped lever 37 carries a hook 42 into engagement with a gear 43 which is carried by a shaft 44 of the motor mechanism. Thus, when the hook 42 engages the gear, the motor can no longer turn. This is important because the only control of the motor drive unit in the form of the invention described herein, resides in the film measuring mechanism which forms a part of the camera shown in my copending application Serial No. 137,483, above referred to. Consequently, if the camera motor unit is removed from the camera, the motor unit would immediately run down unless otherwise held against operation. The same thing, of course, would occur if the handle 34 were moved without releasing the hinge pintle latch to swing the back upon its hinge for loading and unloading film.

However, by providing the motor blocking member on the lever which must be operated for moving the camera back relatively to the camera body, this undesirable operation of the motor is prevented.

The hook 42 can readily hold the motor against operation because it engages a gear 43 on the shaft 44 which also carries the governor 45, which, because of its geared relationship with the power spring 46, has considerable mechanical advantage.

Figure 6:
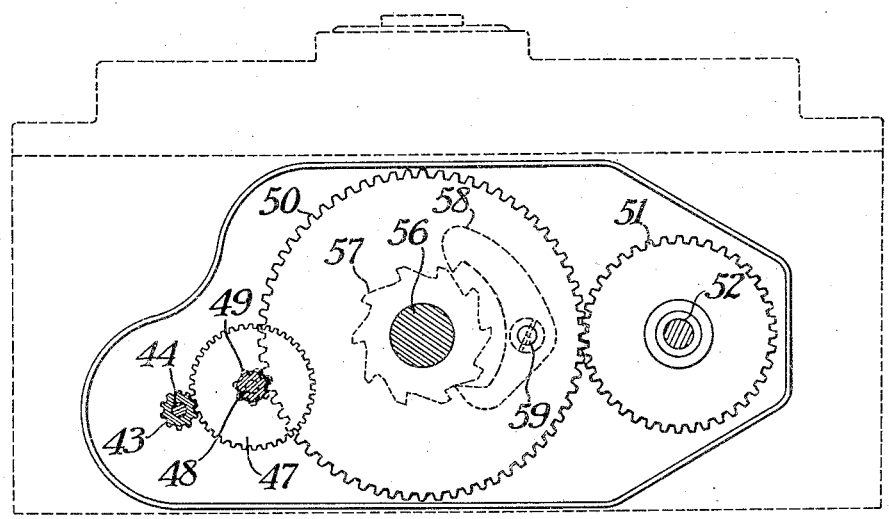
Fig. 6 is a plan view of the motor drive unit removed from the camera back as it would be viewed by looking in the direction of the arrows shown at 6—6 in Fig. 5.

As illustrated in Fig. 6, shaft 44 and gear 43 are so arranged that the gear meshes with gear 47, this gear being carried by a shaft 48 carrying a pinion 49 meshing with the main drive gear 50 which is driven by the motor spring 46. The gearing above described is for operating the governor.

Film is wound through the gear 51, meshing with gear 50, this gear driving a shaft 52 to which there is affixed on the inside of the camera back, a dish-shaped gear 53 as shaft 52 passes through the camera back. This dish-shaped gear is adapted to engage and drive the film winding mechanism as well as the shutter setting mechanism shown in my copending application Serial No. 153,352, above referred to.

In order to wind the motor spring 46, there is a handle 54 on the outside of the camera back, this handle engaging a rectangular portion 55 on the shaft 56 so that by turning this shaft, the ratchet wheel 57 will cause the escapement 58 to idle back and forth upon the shaft 59 as the spring 46 is being tensioned. However, since the escapement 58 and its shaft 59 are carried by the gear 50, when the ratchet wheel 57 is moved by the spring 56, the gear 50 will likewise move.

With a spring motor as above described, the number of exposures which can be quickly and automatically wound in position for exposure, of course, depends upon the size of the film, the strength of the spring and the friction of the camera parts which must be operated by the spring. It has, however, been found a simple matter to design a spring which will run 20 or 25 exposures without making the motor drive unit of undue bulk or weight. This, however, is purely a matter of design, and, if desired, the spring can be made sufficiently powerful to wind the entire roll of film usually provided for such cameras—usually containing 36 exposures—at one winding.

As described in my copending application Serial

No. 174,443, filed November 13, 1937, above referred to, the camera is provided with a trigger member T on the top wall and the operation of this trigger member releases the shutter, which, upon running down, positions the shutter winding and film winding mechanism so that they may be operated. The operation of the present motor drive unit is exactly the same as the hand drive unit, except that the motor is substituted for the hand winding lever.

With a motor drive unit as above described and with a camera properly equipped for its use—that is, a camera having the hinged latch described herein—an operator may readily use either the motor drive unit or the usual camera back or roll holder back which comes as a part of the equipment of the cameras as sold. If he should desire to place the motor drive unit on the camera, the roll holder back or the camera back can be readily removed by releasing the back latch on the normal back corresponding with the handle 34 on the motor unit back. The hinge pintle latch can then be released by withdrawing the pintle from the hinge by means of a handle 29. After removing the back, the motor drive unit may replace it by positioning the hinge element so as to cooperate with the hinge element on the camera body C. The handle 29 is then moved to move the pintle axially through the hinge elements until the latch elements 27 and 29 are brought into cooperative relationship. This will hingedly attach the motor drive unit to the camera. By swinging the motor drive unit upon this hinge connection, it may be brought into a position in which the latch elements 38 and 39 may cooperate with the corresponding latch elements 40 on the camera body, and by moving the handle 34 to the position shown in Fig. 2, these elements may be brought into operation. When this is done, the hook 42 is moved away from the gear 44 and the motor is in position to operate. If the spring 46 is under tension, it is only necessary to depress the trigger T to make an exposure and a fresh area of film will be wound into place. If the spring has not been wound, the handle 54 can be turned to tension the motor.

When it is necessary to load fresh spools of film into the camera, the latch 34 can be moved to release the latch elements 38, 39 and 40 and the back can be swung upon its hinge connection with the camera. However, as soon as the handle 34 is moved, the hook 42, by entering the gear 44, immediately blocks the operation of the motor. The same thing, of course, is true when the motor unit is removed from the camera—that is, the motor is blocked against operation before the motor unit can be removed.

With the construction of the camera latch and camera back above described, it can readily be seen that an operator can easily and quickly change from one back to another, so that he can use the camera assembled to best suit the requirements of the work which is to be done. When a camera back is to be changed, it is, of course, important to be able to determine the number of films remaining in the roll holder, and this can be done in the following manner:

Referring to Fig. 1, it will be noted that the annular member 22 is provided with a flat top 52 in which a disk 53 is mounted so that it may be turned upon the stud 54 by means of a pair of upstanding pins 55. This disk bears a suitable scale 56 graduated into numbers to indicate the number of exposures on a film in the camera. There is a similar film counter on the top of the housing C of the camera which is automatically turned as exposures are made. When an operator desires to remove the roll holder he may note the number of exposures made from the counter on the top C of the camera and turn the disk 53 until the proper graduation on the scale comes opposite to the marker 57. Thus, when the roll holder is removed and replaced on the camera at some later time, it is only necessary to adjust the camera film counter to the same graduation as is indicated by the scale 56 and marker 57 on the removable back.

Of course, if the motor-driven back is to be used on a camera which does not employ a removable roll holder as shown in my copending application above referred to, the addition of this film counting disk to the bottom wall of the roll holder is not necessary.

While I have described a preferred embodiment of my invention, particularly adapted to form a part of a camera shown in a number of copending applications, it is obvious that various changes can readily be made suiting this unit for cameras of other types without departing from the scope of my invention as defined in the following claims.

Having thus described my invention, what I claim as new and desire to be secured by Letters Patent is:

1. A motor drive unit for cameras comprising a camera back, a motor carried by said back, a moveably mounted latch carried by the back and adapted to attach the back to a camera, a handle for operating said latch and a second latch operable with the first mentioned latch for latching or releasing the motor.

2. A motor drive unit for cameras comprising a camera back, a dished gear carried on the inside of the back, a shaft carrying the dished gear and extending through the back, a motor drive connected to the shaft and mounted on the outside of the camera back, a housing covering said motor drive and carried on the outside of the camera back, and means carried by opposite lateral edges of the camera back for releasably attaching the camera back to a camera, at least one of said attaching means including an operating handle, and a latch carried by the handle and adapted to be operated thereby to engage the motor.

3. A motor drive unit for cameras comprising a camera back, a dished gear carried on the inside of the back, a shaft carrying the dished gear and extending through the back, a motor drive connected to the shaft and mounted on the outside of the camera back, a housing covering said motor drive and carried on the outside of the camera back, a moveable latching bar carried by the camera back, a handle for moving the latching bar, a ratchet wheel carried by the motor, and a pawl carried by the latching bar and moveable therewith to and from latching engagement with the ratchet wheel of the motor.

4. A motor drive unit for cameras comprising a camera back, a motor mounted on the camera back, a housing enclosing the motor attached to the camera back, means for transmitting motion from the motor to the camera including a gear, a toothed wheel carried by the motor, a pawl moveable to and from a position engaging said gear, a moveably mounted latching element for holding the camera back on the camera and also carrying said pawl, and means on the outside of the camera back for operating the latching element and pawl.

5. In a motor driven camera, the combination with a camera body including a hinge element on one wall, an opening adjacent said wall across which film may be wound for exposure and through which film is loaded into the camera, of a removably mounted camera back also including a hinge element adapted to cooperate with the hinge element of the camera, a hinge pintle for hingedly attaching the back to the camera, means for slidably attaching the hinge pintle to the camera, a motor drive carried by the camera back, a member for blocking movement of the motor drive, and a latch for holding the back to the camera, said latch being operatively connected to the blocking member to move the same to a blocking position when the latch is operated to move the camera back to uncover the camera opening whereby operation of the motor is prevented.

JOSEPH MIHALYI.